(12) United States Patent
West et al.

(10) Patent No.: US 9,491,810 B2
(45) Date of Patent: Nov. 8, 2016

(54) INDUCTOR FOR SINGLE-SHOT INDUCTION HEATING OF COMPLEX WORKPIECES

(71) Applicant: Inductoheat, Inc., Madison Heights, MI (US)

(72) Inventors: William D. West, Troy, MI (US); Valery I. Rudnev, Rochester Hills, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 303 days.

(21) Appl. No.: 14/306,708

(22) Filed: Jun. 17, 2014

(65) Prior Publication Data

US 2014/0374410 A1 Dec. 25, 2014

Related U.S. Application Data

(60) Provisional application No. 61/838,249, filed on Jun. 22, 2013.

(51) Int. Cl.
| | |
|---|---|
| H05B 6/02 | (2006.01) |
| H05B 6/44 | (2006.01) |
| H05B 6/10 | (2006.01) |

(52) U.S. Cl.
CPC ............. H05B 6/44 (2013.01); H05B 6/102 (2013.01)

(58) Field of Classification Search
CPC .......... H05B 6/44; H05B 6/102; H05B 6/02; H05B 6/04; H05B 6/06; H05B 6/101; H05B 6/36; H05B 6/104; H05B 6/362; H05B 6/365; B23K 1/002
USPC ................ 219/639, 600, 602, 635, 660, 672
See application file for complete search history.

(56) References Cited

U.S. PATENT DOCUMENTS

| | | | | |
|---|---|---|---|---|
| 2,242,838 A | * | 5/1941 | Somes | H05B 6/38 174/110 R |
| 2,288,041 A | * | 6/1942 | Somes | H05B 6/42 219/632 |
| 2,382,779 A | * | 8/1945 | Denneen | H05B 6/36 219/659 |
| 4,535,211 A | * | 8/1985 | Carter | H05B 6/42 219/632 |
| 4,604,510 A | * | 8/1986 | Laughlin | C21D 9/30 148/575 |
| 4,628,167 A | | 12/1986 | West | |
| 6,362,462 B1 | * | 3/2002 | Merrell | C21D 1/10 219/639 |
| 6,765,181 B1 | * | 7/2004 | Chatterjee | H05B 6/14 148/567 |
| 2009/0020525 A1 | | 1/2009 | Loveless et al. | |
| 2011/0036831 A1 | | 2/2011 | Warner et al. | |
| 2012/0222779 A1 | * | 9/2012 | Itagaki | F16D 3/202 148/400 |

OTHER PUBLICATIONS

Valery Rudnev, Don Loveless, Raymond Cook and Micah Black, Handbook of Induction Heating, 2003, pp. 248, 252, 253, and 500-502, Marcel Dekker, Inc., New York, NY (8 pages total).

* cited by examiner

*Primary Examiner* — Justin Jonaitis
(74) *Attorney, Agent, or Firm* — Philip O. Post

(57) ABSTRACT

A single-shot inductor is provided to induction heat treat a complex workpiece that has an at least partially cylindrical component with its central axis coincident with the central axis of a circular component and connected at one end to the circular component with a diameter larger than the diameter of the at least partially cylindrical component. The single-shot inductor has a single crossover inductor section connected to the first ends of two longitudinal leg inductor sections with the second ends of the two longitudinal leg inductor sections connected to a collar inductor section that surrounds the entire circumference of the at least partially cylindrical component when the complex workpiece is loaded in the single-shot one-turn inductor for an induction heating application. Alternatively the single-shot inductor may have two collar inductor sections interconnected between two longitudinal leg inductor sections where one of the leg sections can accept a supply of alternating current.

15 Claims, 12 Drawing Sheets

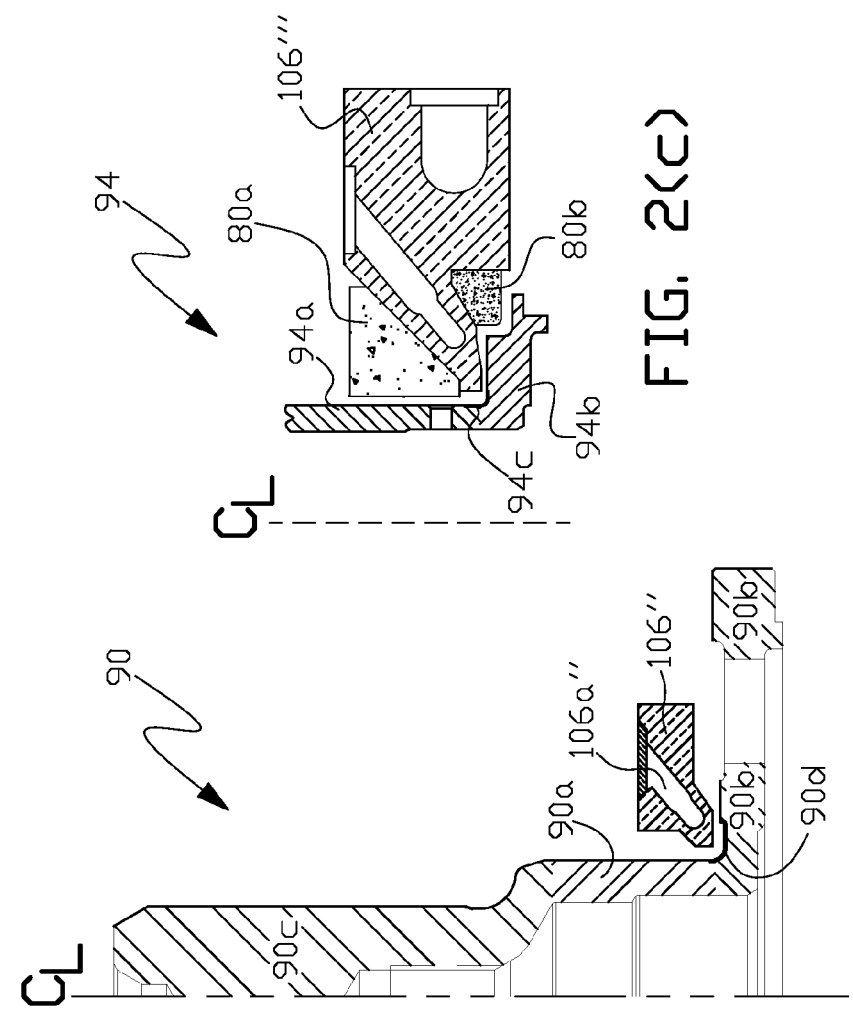
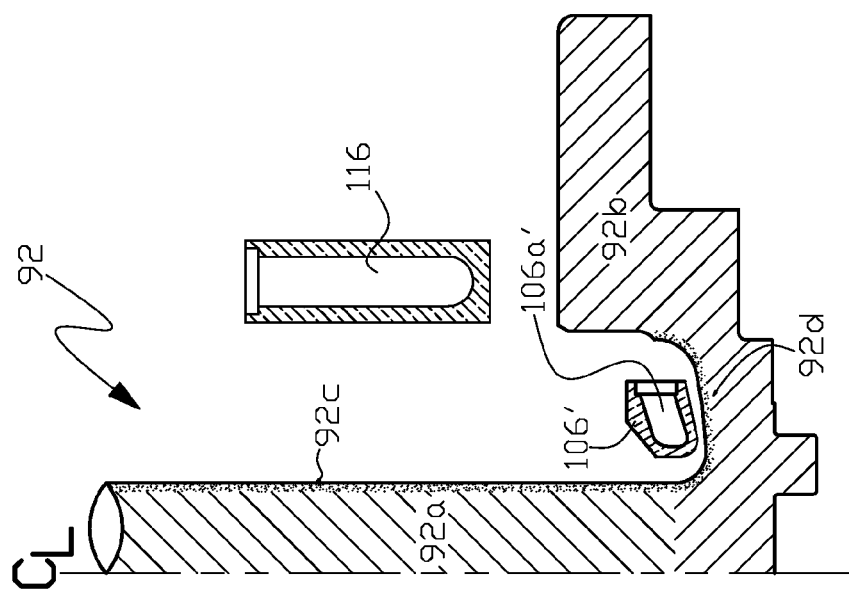
FIG. 2(a)
FIG. 2(b) PRIOR ART
FIG. 2(c)

INDUCTOR FOR SINGLE-SHOT INDUCTION HEATING OF COMPLEX WORKPIECES

CROSS REFERENCE TO RELATED APPLICATIONS

This application claims the benefit of U.S. Provisional Application No. 61/838,249, filed Jun. 22, 2013, hereby incorporated by reference in its entirety.

FIELD OF THE INVENTION

The present invention relates to electric induction single-shot heat treatment of complex workpieces having an at least partially cylindrical component with its central axis coincident with the central axis of a circular component and connected at one end to the circular component with a diameter larger than the diameter of the at least partially cylindrical component.

BACKGROUND OF THE INVENTION

A workpiece in the shape of a right circular cylinder such as a solid or hollow shaft can be metallurgically heat treated (hardened) to withstand forces that are applied to the workpiece in the intended application. For example the workpiece may be automotive components of various cylindrical shapes that are metallurgically hardened for use in motor vehicle powertrains.

More complex workpieces are formed by combining multiple cylindrical components having different diameters, fillets, shoulders, holes and other geometrical irregularities. Examples of such complex geometries are illustrated in FIG. 5.28 (right side figure) and FIG. 5.36 of the *Handbook of Induction Heating* (Valery Rudnev et al., 2003, Marcel Dekker, Inc., New York, N.Y.). FIG. 1(*a*) illustrates another example of a complex workpiece. In general these complex workpieces can be characterized as having an at least partially cylindrical component with its central axis coincident with the central axis of a circular component and connected at one end to the circular component with a diameter larger than the diameter of the at least partially cylindrical component, and for convenience, such workpieces are referred to herein as "complex workpieces." For example, for complex workpiece 90 shown in FIG. 1(*a*), the workpiece component within dashed box 90*a* is the at least partially cylindrical component and the workpiece component within dashed box 90*b* is the circular component with a diameter larger than the diameter of the at least partially cylindrical component, and these two workpiece regions are oriented so that the at least partially cylindrical component 90*a* has its central axis $C_L$ coincident with the central axis of circular component 90*b* and connected at one end to the circular component 90*b* with an outside diameter $d_2$ larger than the outside diameter $d_1$ of the at least partially cylindrical component 90*a*.

Electric induction heating is used in a variety of heat treatment processes, such as annealing, normalizing, surface (case) hardening, through hardening, tempering and stress relieving. One of the most popular applications of induction heat treatment is the hardening of steels, cast irons and powder metallurgy components. In some cases heat treatment of the entire workpiece is required; however in other cases it is only necessary to heat treat selected regions of the workpiece.

A typical induction hardening process involves heating the workpiece or the region of the workpiece required to be strengthened up to the austenitizing temperature; holding (if required) the workpiece or region at austenitizing temperature for a sufficient period of time to complete austenitization; and then rapidly cooling the workpiece or region to below the temperature where a desirable martensitic structure starts to form. Rapid cooling or quenching allows replacement of the diffusion-dependent transformation process by a shear-type transformation creating a much harder constituent called martensite. Martensite can be formed and hardening may be done either on the surface of the workpiece or region, or throughout the entire cross section of the workpiece or region. Workpieces are induction hardened for different reasons. For example hardening may be done to increase torsional strength and/or torsional fatigue life, to improve bending strength and/or bending fatigue life, or to improve wear resistance or contact strength.

Various types of heating inductors can be utilized to induction harden a cylindrical or complex workpiece. Since induction heating of a workpiece is dependent upon magnetic flux coupling with regions of the workpiece to induce eddy current heating in the workpiece, a uniform inductive heat treatment within complex geometry areas, such as fillets between adjacent cylindrical components, is difficult to achieve with typical induction coil arrangements. The inductive heating process is further complicated by the fact that generally heat penetration into the interior of the workpiece is a combination of both inductive eddy current heating inwardly, and then further conductive inward heat transfer from the eddy current regions (controlled by the depth of induced current penetration) towards the central region of the workpiece, which conductive heating process is known in the art as heat "soaking"

An inductor's configuration depends upon specific parameters of the application that include the geometry of the workpiece; the composition of the heated material; the available space for inductor installation; the heating mode (for example, scanning, single-shot, progressive or static heating mode); the workpiece production rate; the required heating pattern; and the details of the workpiece handling (that is, how the workpiece is loaded and unloaded).

Inductors for induction hardening are typically fabricated from copper or copper alloys because of copper's high electrical and thermal conductivities, its inherent corrosion resistance and superior cold and hot workability.

Channel-type (also known as single-shot or slot) inductors are one type of inductor that are most suitable for through and surface hardening of cylindrical and complex workpieces. With the channel inductor neither the workpiece nor the induction coil moves relative to each other except for possible rotation of the workpiece. Channel inductors can be single-turn or multi-turn inductors. Multi-turn channel inductors are typically applied for through heating of the ends of billets or bars prior to hot forming, for example, in an article forging process. Single-turn channel inductors are typically used for induction hardening cylindrical or complex components that are representatively shown in FIG. 5.28 (right side figure) and FIG. 5.36 in the *Handbook of Induction Heating*. Typical applications for single-turn channel inductors are hardening of carbon steel shafts such as output shafts, flanged shafts, yoke shafts, intermediate shafts and drive shafts.

A single-turn channel inductor consists of two longitudinal legs and two crossover segments (also known as bridges or horseshoe-style half loops). Crossover segments do not encircle the entire circumference of the workpiece to be heat treated but only a portion that is typically half of the circumference. When longitudinal regions of the workpiece are required to be heated, induced eddy currents primarily flow along the length of the workpiece. An exception would be the crossover segments of the channel inductor where the flow of eddy current is half circumferential. As an example FIG. 5.33 in the *Handbook of Induction Heating* shows a channel inductor used for induction hardening of axle shafts. Instantaneous electrical alternating current in each of the two longitudinal legs and each of the two crossover segments are in opposite directions with respect to each other.

The length of the heated region can be controlled by fabricating channel inductors with longitudinal leg sections of different lengths. FIG. 1(b) shows one example of a prior art single-turn channel inductor 100. First (upper) crossover section 102 comprises crossover half-sections 102a and 102a; longitudinal leg sections 104a and 104b and second (lower) crossover section 106. Complex workpiece 90 is inserted into single-turn saddle inductor 100 as shown in FIG. 1(c). Crossover half-sections 102a and 102a' (FIG. 1(b)) are electrically isolated from each other, for example by dielectric slot 112 so that crossover half-sections 102a and 102a' can be connected to the outputs of alternating current power source 114. Since the crossover sections and the longitudinal leg sections of inductor 100 only partially surround the circumference of complex workpiece 90 the workpiece is rotated about its central axis $C_L$ while loaded in the heat treatment position shown in FIG. 1(c).

Channel inductor 100 in FIG. 1(b) and FIG. 1(c) is oriented in the vertical direction for single-shot workpiece loading and removal either in the vertical or horizontal direction.

Longitudinal leg sections of a single-turn channel inductor may be profiled by relief shaping selected regions of the longitudinal legs to accommodate specific geometrical features of the heat-treated workpiece, such as changes in diameter of the workpiece. Similarly one or both crossover sections of a single-turn channel inductor can be profiled or curved for generating required magnetic field coupling with the appropriate regions of the workpiece to achieve required temperature profiles. Fabricating required section(s) of the channel inductor with narrower heating surfaces facing the workpiece can increase density of the induced power in desirable region(s).

FIG. 2(a) through FIG. 2(c) illustrate three typical examples of profiled crossover segments of prior art single-shot channel inductors near a fillet region.

FIG. 2(a) shows a lower-half crossover section 106' of a single-shot one-turn prior art channel inductor heating apparatus for heat treating a solid complex workpiece 92. Only the right half of lower crossover section 106' (similar to cross over section 106 in FIG. 1(b)) of a vertically oriented channel inductor is shown in FIG. 2(a) with internal cooling passage 106a' for flow of an inductor cooling medium. Separate quench apparatus 116 is provided in this example for quenching when the workpiece achieves required thermal conditions after being heated in the channel inductor. Alternate quenching methods include quenching after the workpiece has been heated and unloaded from the channel inductor. Axis of vertical symmetry $C_L$ is indicated for the core of the solid cylindrical component 92a of complex workpiece 92. Thus for complex workpiece 92 the at least partially cylindrical component is solid shaft cylindrical component 92a and the circular component with a diameter larger than the diameter of the at least partially cylindrical component is component 92b (with cross hatching in opposing direction of the crosshatching for component 92a). Thus the at least partially cylindrical component 92a has its central axis coincident with the central axis of circular component 92b and is connected at one end to circular component 92b with a diameter larger than the diameter of the at least partially cylindrical component 92a as shown in FIG. 2(a). Outside diameter 92c and fillet region 92d of complex workpiece 92 are included in the regions for induction hardening and are shown as stippled regions. Outside diameter 92c will be heated due to induced eddy current generated by electrical current flowing in the longitudinal leg sections 104a and 104b (not shown in FIG. 2(a)) of the channel inductor. Induced heating in fillet region 92d is primarily generated by channel inductor current flowing in lower crossover section 106' of the channel inductor.

FIG. 2(b) shows lower crossover section 106'' (in right-half view only) of a single-shot one-turn prior art channel inductor heating apparatus for heat treating hollow complex workpiece 90, which is the workpiece also shown in FIG. 1(a). Only half of lower crossover section 106'' (similar to cross over section 106 in FIG. 1(b)) of a vertically oriented channel inductor is shown in FIG. 2(b) with internal cooling passage 106a'' for flow of an inductor cooling medium. Separate quench apparatus is not shown in FIG. 2(b). Axis of vertical symmetry $C_L$ is indicated for the core of the hollow cylindrical component (90a and 90c) of complex workpiece 90 with the hollow interior core region shown without cross hatching. Thus for complex workpiece 90, as also described above relative to FIG. 1(a), the at least partially cylindrical component is hollow cylindrical component 90a and the circular component with a diameter larger than the diameter of the at least partially cylindrical component is designated component 90b in the figure so that the at least partially cylindrical component 90a has its central axis coincident with the central axis of circular component 90b and is connected at one end to circular component 90b with a diameter larger than the diameter of the at least partially cylindrical component 90a as shown in FIG. 2(b).

When a workpiece has hardening regions that include fillets as in FIG. 2(a) and FIG. 2(b) it is often necessary to substantially increase the induced heat intensity in the fillet region since the fillet region has a substantially greater mass of metal to heat. Additionally there is an appreciably larger workpiece mass in the proximity of the heated fillet and behind the region to be hardened that develop a substantial "cold" sink effect that draws heat from the heated fillet due to thermal conductivity. Therefore cooling effect of the cold sink effect must be compensated for by inducing additional heating energy in the fillet area. Required energy surplus is often achieved by narrowing the current carrying face of the appropriate section of the channel inductor to increase the induced power density within the appropriate regions. For example if the current carrying portion of the heating face of the inductor section is decreased by half then there will be corresponding increase in the inductor section's current density as well as the density of the eddy current induced within the respective workpiece region. According to the Joule effect if the density of induced eddy current doubles then the induced power density increases four times.

For the arrangements in both FIG. 2(a) and, in particular FIG. 2(b), the heating face of the inductor in the crossover region that faces the fillet region has been profiled to concentrate an induced eddy current and heat generation within the fillet region.

FIG. 2(c) shows a detail view of a lower-half crossover section 106''' of an alternative prior art single-shot one-turn channel inductor heating apparatus where magnetic flux concentrators 80a and 80b are provided in addition to crossover section inductor profiling to provide further concentration of heating energy in the fillet region 94c of complex workpiece 94. Localized current density of an inductor can be increased appreciably when magnetic flux concentrators are utilized.

Magnetic flux concentrators (also called flux intensifiers, flux controllers, shunts, diverters, or magnetic cores) affect the electromagnetic coupling between the workpiece and the magnetic field of the channel inductor. There are several traditional functions of magnetic flux concentrators in induction hardening: (a) providing a selective heating of certain areas of the workpiece; (b) improving the electrical efficiency of the inductor; (c) and acting as an electromagnetic shield and preventing undesirable heating of adjacent areas. Flux concentrators are made from high-permeability soft-magnetic materials having low electrical conductivity. The soft-magnetic nature of flux concentrators means that they are magnetic only when an external magnetic field is applied. Upon being exposed to an alternating current magnetic field, these materials can change their magnetization rapidly without much friction. Narrow magnetic hysteresis loops of small area are typical for these materials. Concentrators provide a path of low magnetic reluctance and facilitate the concentration of flux lines in desired regions. If a magnetic flux concentrator is introduced into the inductor field, it will provide a low-reluctance path for the magnetic flux, reducing stray flux and concentrating the imaginary flux lines of magnetic field. Without a flux concentrator, the magnetic field would spread around the inductor and link with the electrically conductive surroundings (e.g., auxiliary equipment, metal support, tools, fixtures, workpiece regions that are not desirable to be heated, for example). The concentrator forms the magnetic path to guide the inductor's magnetic field in desired areas. The above-mentioned factors have potentially positive effects on induced heating selective regions. However localized current densities in certain regions of the inductor can be substantially increased and potentially causing localized inductor overheating, and/or hastening the onset of inductor stress cracking (by work hardening of the inductor, for example).

One of the main drawbacks of a conventional single-turn channel inductor is its short life. The requirement for producing sufficient heat generation in selected regions of the workpiece such as fillet regions results in the necessity of having an appreciably narrow inductor heating face in combination with using magnetic flux concentrators, which is associated with excessive coil current density and premature failure of the heating inductor. Premature inductor failure (cracking, stress-corrosion or stress fatigue) typically occurs in the region of highest current density and usually takes place in the crossover section 106 of a single-turn channel inductor that provides heating of fillets. Crossover sections also experience an inductor flexing due to the presence of electromagnetic forces. Therefore in order to increase the life of hardening inductors attempts should be taken to reduce current densities in that region.

Another drawback of conventional single-turn channel inductors is associated with an excessive process sensitivity that negatively affects quality and heating repeatability of hardened components. Excessive sensitivity is associated with an electromagnetic proximity effect. If the positioning of the workpiece inside of the channel inductor changes (for example, by wear of bearings associated with apparatus for rotating the workpiece within the inductor, incorrect loading of the workpiece in the inductor) then there will be an immediate variation of the heating intensity particularly within the fillet region. This typically results in a temperature deficit and reduced hardness depth associated with it.

One object of the present invention is to provide an improved inductor for single-shot induction heating of complex workpieces where an at least partially cylindrical component with its central axis coincident with the central axis of a circular component and connected at one end to the circular component with a diameter larger than the diameter of the at least partially cylindrical component with increased inductor life, improved robustness and reduced heating sensitivity to the workpiece positioning within the inductor.

The above and other aspects of the invention are set forth in this specification and the appended claims.

BRIEF SUMMARY OF THE INVENTION

In one aspect the present invention is an apparatus for, and method of induction heat treating a complex workpiece with a single-shot inductor. The complex workpiece has an at least partially cylindrical component with its central axis coincident with the central axis of a circular component and connected at one end to the circular component with a diameter larger than the diameter of the at least partially cylindrical component. The single-shot one-turn inductor has a single crossover inductor section connected to the first ends of two longitudinal leg inductor sections with the second ends of the two longitudinal leg inductor sections connected to a collar inductor section that surrounds the entire circumference of the at least partially cylindrical component of the complex workpiece when the complex workpiece is loaded in the single-shot one-turn inductor for an induction heating application. The crossover inductor section along with the collar inductor section and the longitudinal leg inductor sections are connected electrically in series to form a complete electrical circuit.

In another aspect the present invention is an apparatus for, and method of induction heat treating a complex workpiece with a single-shot inductor. The complex workpiece has an at least partially cylindrical component with its central axis coincident with the central axis of a circular component and connected at one end to the circular component with a diameter larger than the diameter of the at least partially cylindrical component. The single-shot one-turn inductor has a first collar inductor section connected to the first ends of two longitudinal leg inductor sections with the second ends of the two longitudinal leg inductor sections connected to a second collar inductor section. The first and second collar inductor sections surround the entire circumference of the at least partially cylindrical component of the complex workpiece when the complex workpiece is loaded in the single-shot one-turn inductor for an induction heating application. One of the two longitudinal leg inductor sections is arranged to supply an alternating current to the single-shot inductor.

The single-shot inductor of the present invention can also be used to heat treat cylindrical workpieces where the axial length of the cylindrical workpiece is inserted in a single-shot inductor of the present invention.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims.

FIG. 2(a), FIG. 2(b) and FIG. 2(c) illustrate prior art arrangements for heat treating complex workpieces with a single-turn channel inductor where only the right-half cross section of the inductor's lower crossover section is shown.

DETAILED DESCRIPTION OF THE INVENTION

Figure 1A:
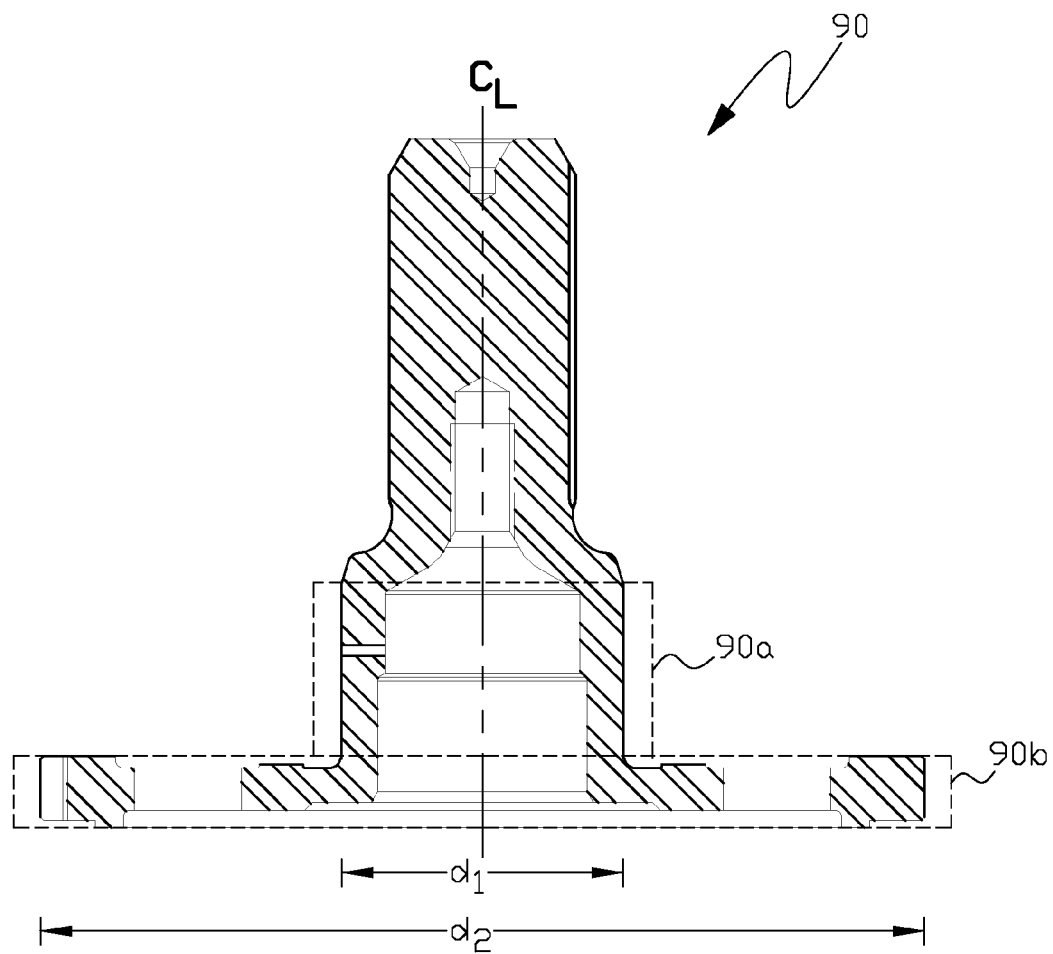
FIG. 1(a) is an example of a complex workpiece where an at least partially cylindrical component of the complex workpiece has its central axis coincident with the central axis of a circular component and connected at one end to the circular component of the workpiece with a diameter larger than the diameter of the at least partially cylindrical component.
Figure 1B:
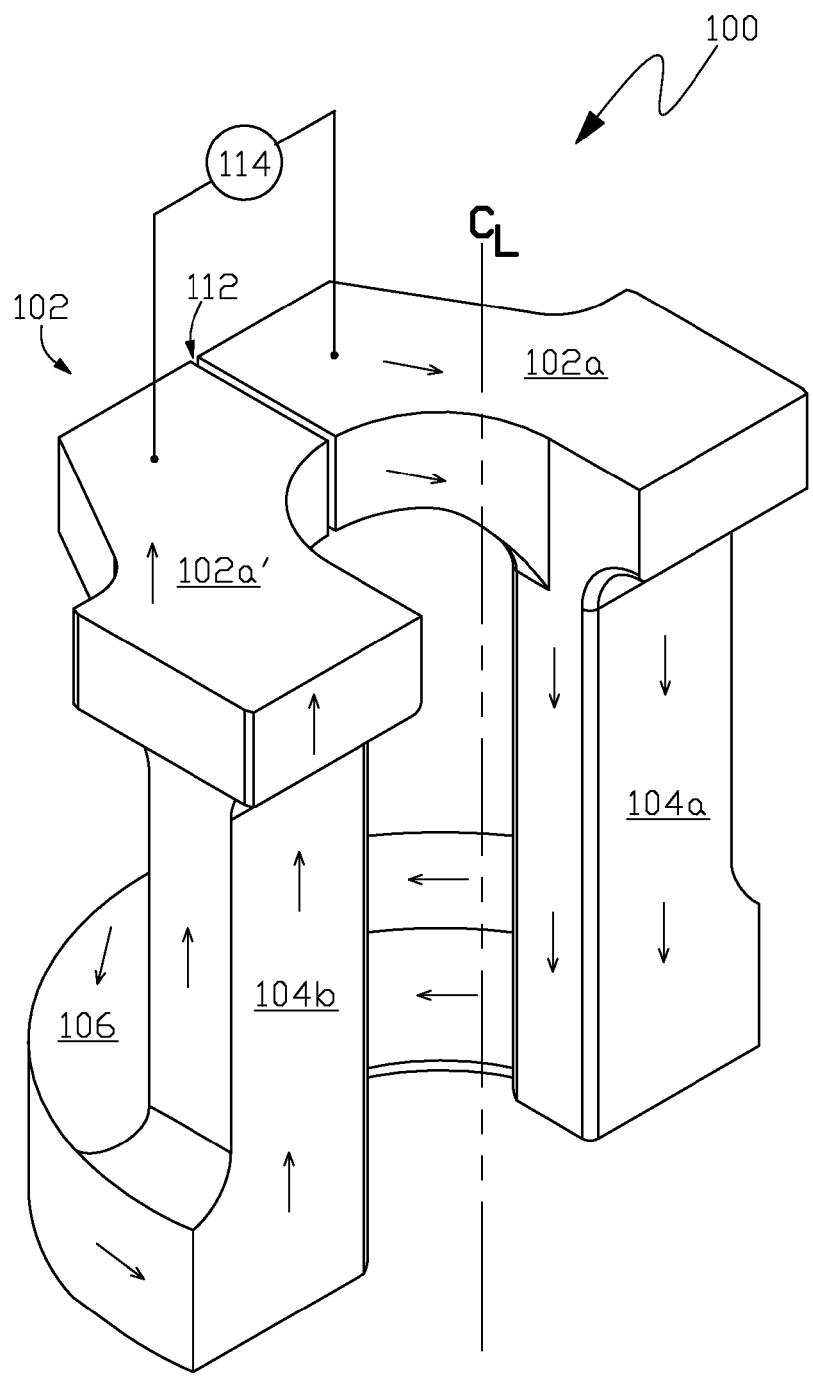
FIG. 1(b) is an isometric view of one example of a prior art channel inductor that can be used to heat treat the complex workpiece in FIG. 1(a).
Figure 1C:
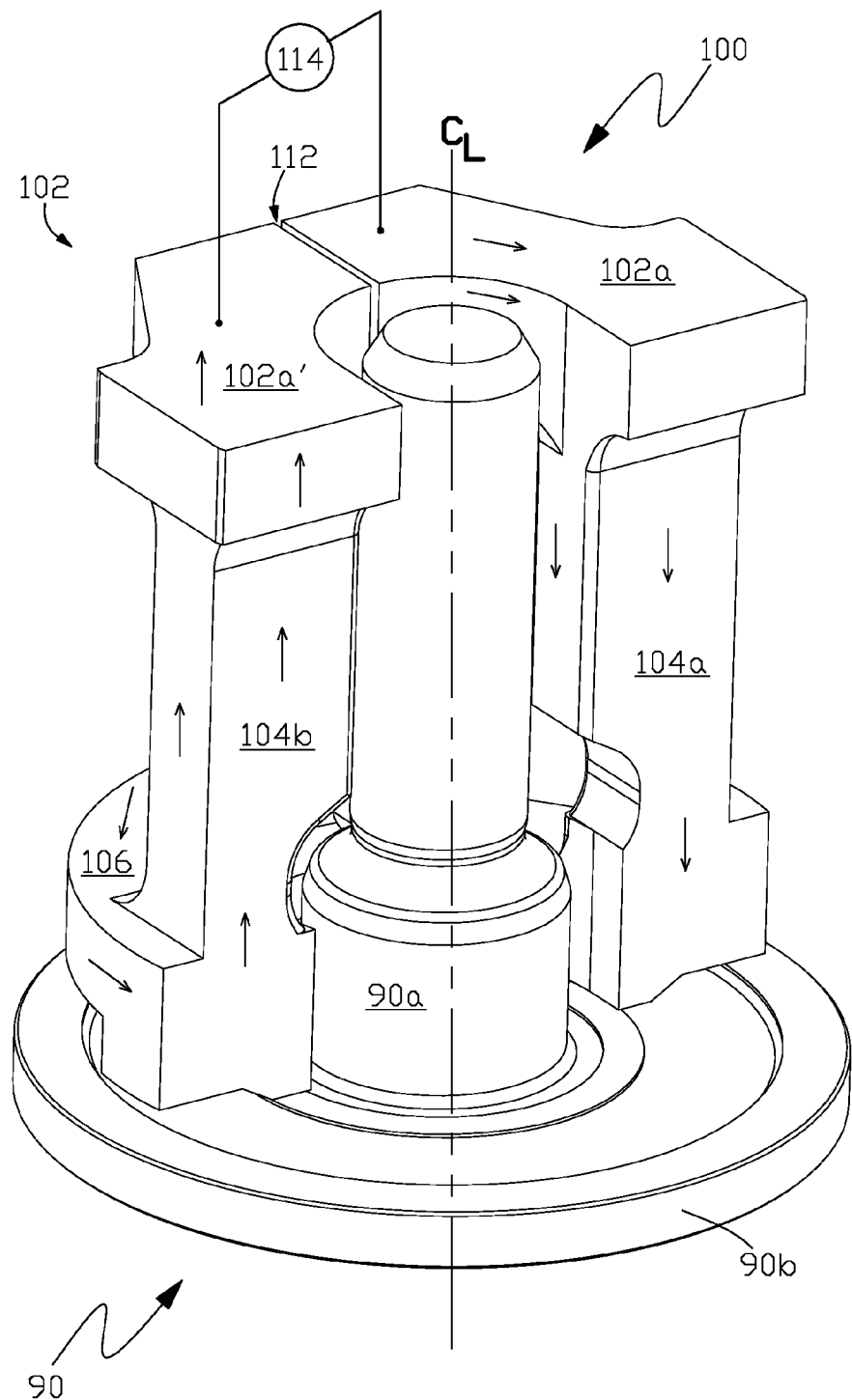
FIG. 1(c) illustrates the complex workpiece shown in FIG. 1(a) loaded into the prior art channel inductor in FIG. 1(b).
Figure 3:
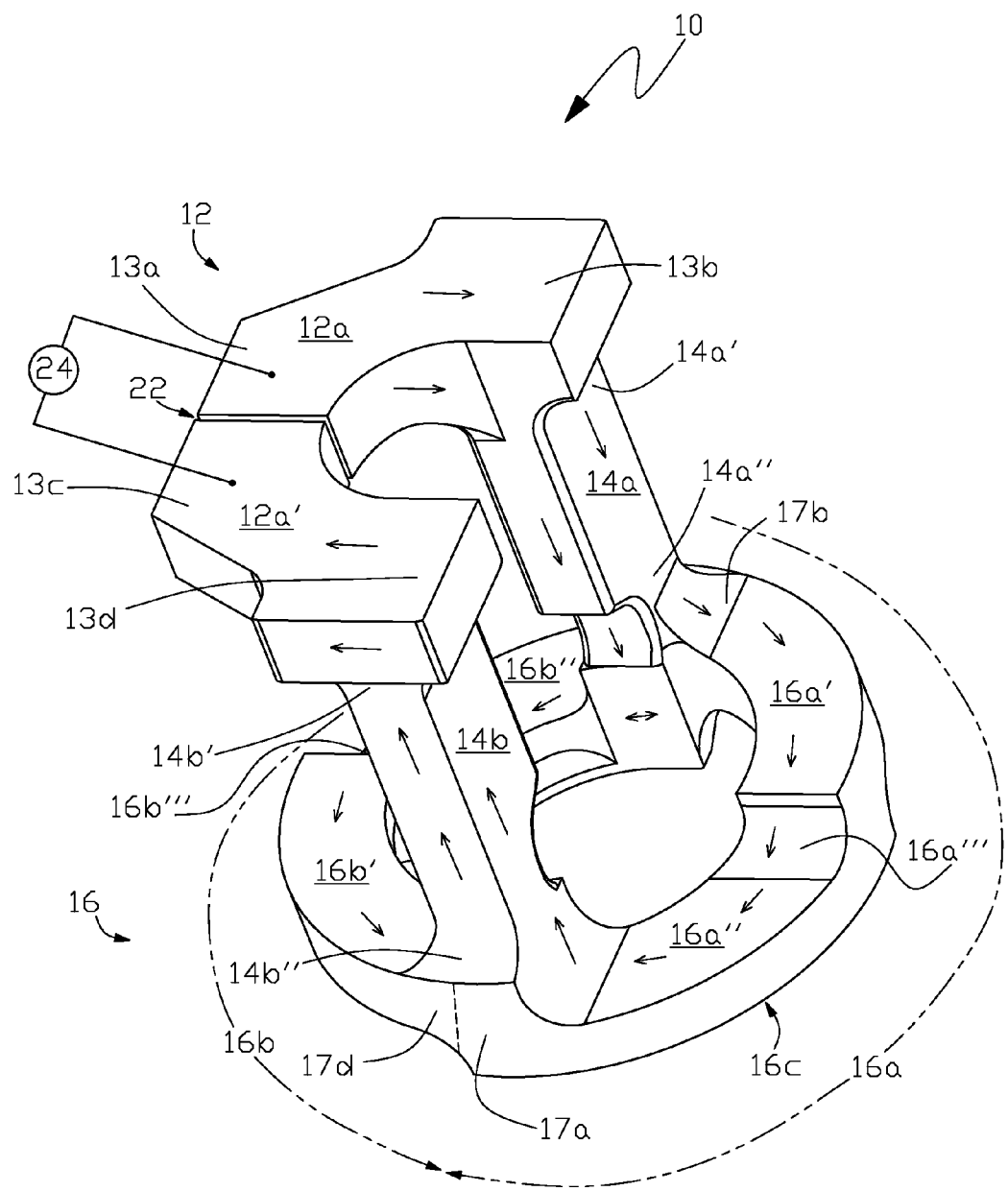
FIG. 3 is an isometric view of one example of a single-shot inductor of the present invention with arrows indicating instantaneous current flow through the inductor.

FIG. 3 through FIG. 5(b) illustrate one example of single-shot inductor 10 of the present invention. Referring to FIG. 3 single-shot inductor 10 comprises crossover inductor section 12, longitudinal leg sections 14a and 14b, and collar inductor section 16. Crossover section 12 comprises crossover half-sections 12a and 12a'. Crossover half-sections 12a and 12a' are electrically isolated from each other, for example by dielectric slot 22 so that crossover half-sections 12a and 12a' can be connected to the outputs of alternating current power source 24. Dielectric slot 22 may be an air-filled dielectric or filled with an electrical insulating material such as sheet mica. Collar inductor section 16 comprises continuous collar half-sections 16a and 16b forming a continuous electrical conductor that is electrically connected to longitudinal leg sections 14a and 14b. Both half-sections 16a and 16b of collar inductor section 16 are connected electrically in parallel with respect to each other. Each of the half-sections 16a and 16b of collar inductor section 16 is profiled in this example with high step (16a' and 16b') and low step (16a" and 16b") regions connected via sloped interconnect regions (16a''' and 16b''') as show in FIG. 3 (step region 16b" partially hidden in the figure). In all embodiments of the invention profiling can be accomplished by relief shaping selected regions of the collar inductor section as may be required to accommodate geometrical features of a particular complex workpiece being heat treated. Optionally the crossover inductor section or longitudinal leg inductor sections may also be profiled.

Instantaneous alternating current flows through single-shot inductor 10 is illustrated by the arrows in FIG. 3. Thus instantaneous current flows into one of the two longitudinal leg sections from one of the crossover half sections to collar inductor section 16, then through parallel collar half-sections 16a and 16b and out of collar inductor section 16 to the other longitudinal leg section for return to the other crossover half section. This arrangement reduces the magnitude of current in each of the collar half-sections that is required in comparison with the prior art single-shot one-turn channel inductors described above that have two crossover sections while retaining the same required heating energy in the workpiece by encircling the entire circumference of the workpiece in contrast to the prior art partial encircling described above. Reduction in current magnitudes in the collar half-sections reduces current densities and electromagnetic forces that results in increased life of single-shot inductor 10 over that of the prior art single-shot one-turn channel inductors.

For purposes of illustration and not limitation, crossover half-section 12a may be referred to as a supply crossover section; longitudinal leg inductor section 14a may be referred to as a supply longitudinal leg inductor section; longitudinal leg inductor section 14b may be referred to as a return longitudinal leg inductor section; and crossover half-section 12a' may be referred to as a return crossover section. Supply crossover section has a power source supply end 13a and an opposing supply leg crossover section end 13b. The return crossover section has a power source return end 13c and an opposing return leg crossover section end 13d. The first collar section 16a has opposing first collar section supply leg end 17b and a first collar section return leg end 17a, and the second collar section 16b has opposing second collar section supply leg end 17c (see FIG. 4(b)) and a second collar section return leg end 17d. Dashed lines are used for reference to the ends of each first and second collar sections 16a and 16b; collar inductor section 16 (formed from first and second collar sections 16a and 16b) is typically fabricated as a continuous generally annular cylindrical component. Supply longitudinal leg inductor section 14a has a supply leg crossover end 14a' and a supply leg collar end 14a". The supply leg crossover end 14a' is connected to the supply leg crossover section end 13b, and the supply leg collar end 14a" is connected between the first and second collar sections supply leg ends 17b and 17c. Return longitudinal leg inductor section 14b has return leg crossover end 14b' and return leg collar end 14b". The return leg crossover end 14b' is connected to the return leg crossover section end 13d, and the return leg collar end 14b" is connected between the first and second collar sections return leg ends 17a and 17d to form the continuous electrical conductor from the first and second collar sections around the supply and return leg collar ends of the supply and the return longitudinal leg inductor sections whereby when the at least partially cylindrical component of the complex workpiece is situated between the supply and return longitudinal le inductor sections and the circular component of the complex workpiece is situated adjacent to the exterior face 16c of the collar inductor section, and an alternating current power source is connected between the power source supply end of the supply crossover section and the power source return end of the return crossover section, the complex workpiece is inductively heat treated.

Figure 4A:
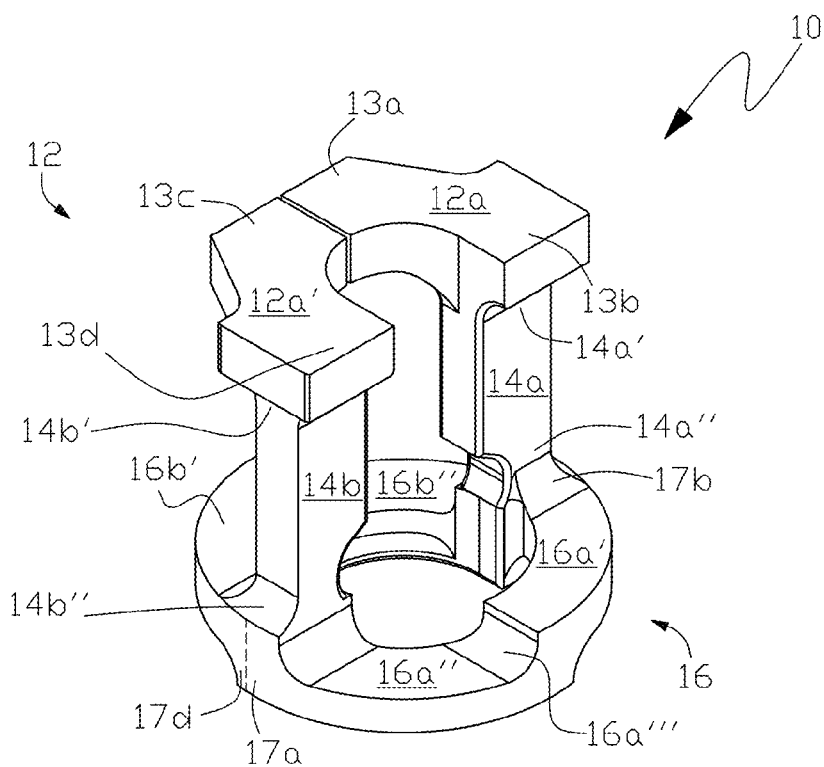
FIG. 4(a) and FIG. 4(b) is the single-shot inductor in FIG. 3 illustrated with 90 degrees central axis rotation between FIG. 4(a) and FIG. 4(b) to show one example of inductor step regions located on the collar inductor section to accommodate required workpiece hardness patterns and workpiece geometry features such as diameter changes for a particular workpiece being heated.
Figure 4B:
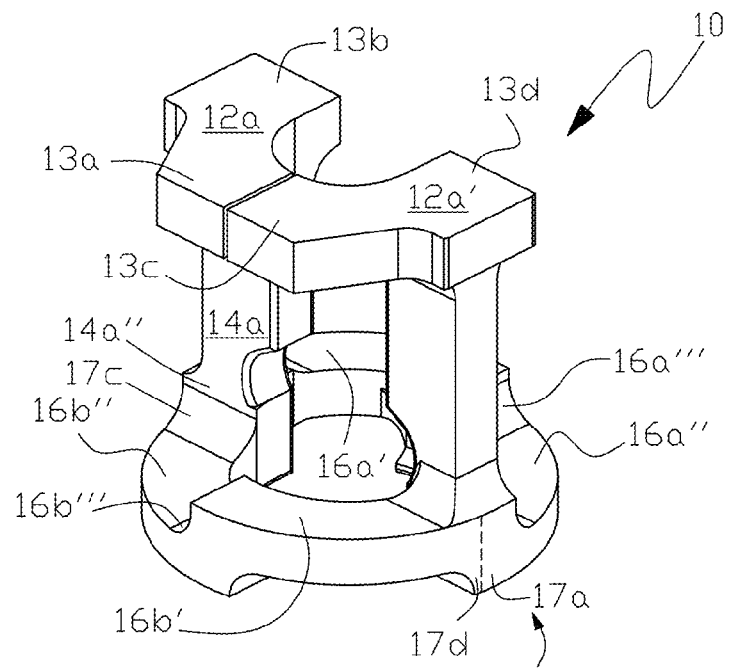

FIG. 4(a) and FIG. 4(b) divide continuous collar inductor section 16 into profiled regions 16a' and 16a" of first collar section 16a (see FIG. 3)), and 16b' and 16b" of second collar section 16b (see FIG. 3)) to illustrate one example of profiling continuous collar inductor section 16 that is formed from the first and second collar sections. As mentioned above such profiling of the collar into inductor step regions accommodates required workpiece hardness patterns and workpiece geometry features such as diameter changes or wall thickness variations (for example, when the at least partially cylindrical component of the complex workpiece being heat treated is hollow). Two or more step regions may be required in each collar half-section and all or some of the collar steps may not be equal in volume to each other. Additionally the arc (arcuate) length of each sloped interconnect region (16a''' and 16b''') can be different from each other and are fabricated to have a different impact on energy induced in particular areas of the complex workpiece such as the shaft region or a fillet region between the at least partially cylindrical component and the circular component of the complex workpiece.

Figure 5A:
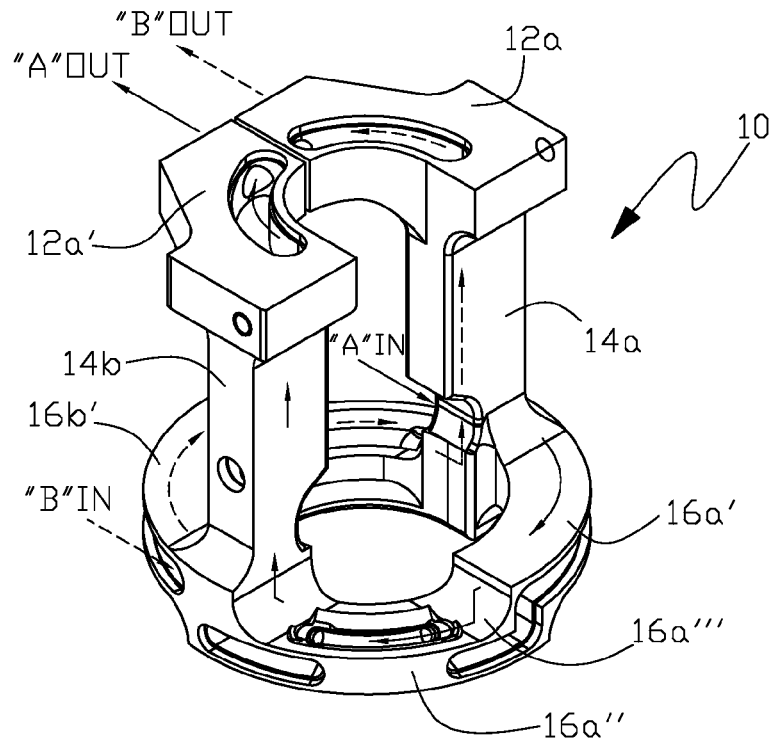
FIG. 5(a) and FIG. 5(b) is the single-shot inductor in FIG. 4(a) and FIG. 4(b) with partial cutouts to show internal cooling medium flow passages through the inductor.
Figure 5B:
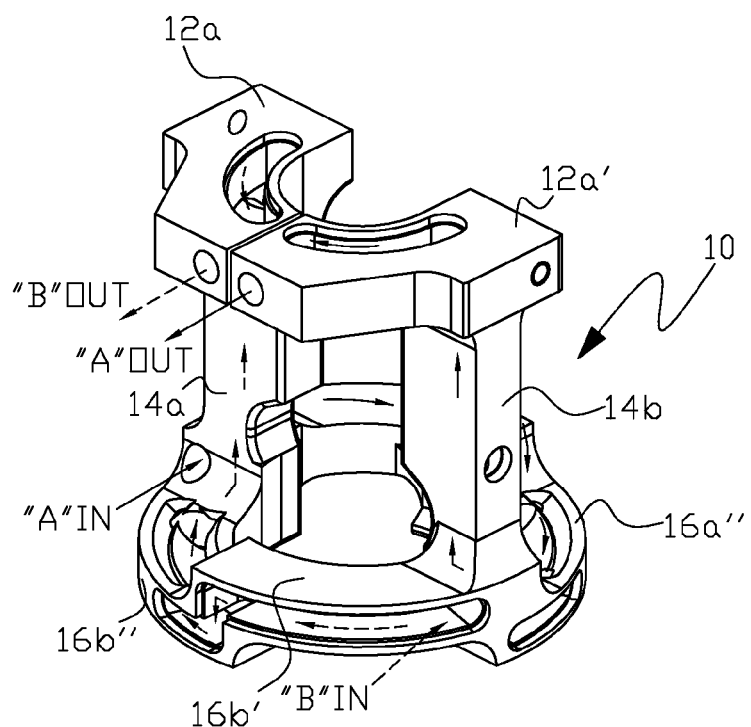

FIG. 5(a) and FIG. 5(b) illustrate inlet and output ports on single-shot inductor 10 for supply and return of a fluid cooling medium for cooling inductor 10 caused by Joule effect heating when alternating current flows through the inductor. Two separate cooling circuits are provided in this example, namely cooling circuit "A" (shown with solid arrows) and cooling circuit "B" (shown in dashed arrows). As shown in FIG. 5(a) and FIG. 5(b) supply inlet ("A" IN) cooling path is sequentially through: collar half-section 16a (16a' and 16a"); longitudinal leg inductor section 14b and crossover half-section 12a' to return outlet ("A" OUT), and supply inlet ("B" IN) cooling path is sequentially through: collar half-section 16b (16b' and 16b"); longitudinal leg inductor section 14a and crossover half-section 12a to return outlet ("B" OUT). Separate dual cooling circuits for different sections of inductor 10 are of an advantage in that they allow for different cooling parameters to compensate for any non-symmetrical features in fabrication of inductor 10. Also each separate supply inlet enters and first cools separate collar half-sections, which will generate the greatest heat, and then continues to flow through separate longitudinal leg inductor sections and separate crossover half-sections. In alternative examples of the invention, water cooling may not be required or a single cooling circuit for the entire inductor may be sufficient and utilized for a particular complex workpiece of the present invention.

In FIG. 3 through FIG. 5(b) the crossover inductor section is generally (that is, without profiling) semicylindrical in shape and separated into generally quarter-cylindrical crossover half-sections by dielectric slot 22. In other embodiments of the invention the crossover inductor section can generally be greater or less than semicylindrical in shape, and the crossover half-sections may be generally greater or less than quarter-cylindrical half-sections of equal mirror-image shapes, or of unequal shapes for a particular complex workpiece being heat treated. In FIG. 3 through FIG. 5(b) each longitudinal leg inductor section is generally (that is, without profiling) a rectangular bar in shape and generally (that is, without profiling) perpendicular to a radial cross sectional plane of the crossover inductor section and the collar inductor section, which plane is perpendicular to the central axis $C_L$, and maybe otherwise shaped or oriented in other embodiments of the invention for a particular complex workpiece being heat treated. In FIG. 3 through FIG. 5(b) the collar inductor section is generally (that is, without profiling) in the shape of an annular cylindrical ring with the collar half-sections annular semicylindrical rings of equal arcuate length, with the opposing longitudinal leg inductor sections connected to the adjacent ends of the two collar half-sections as shown in the figures; in other examples of the invention the collar half-sections may be of unequal arcuate length for a particular workpiece being heat treated.

Figure 6:
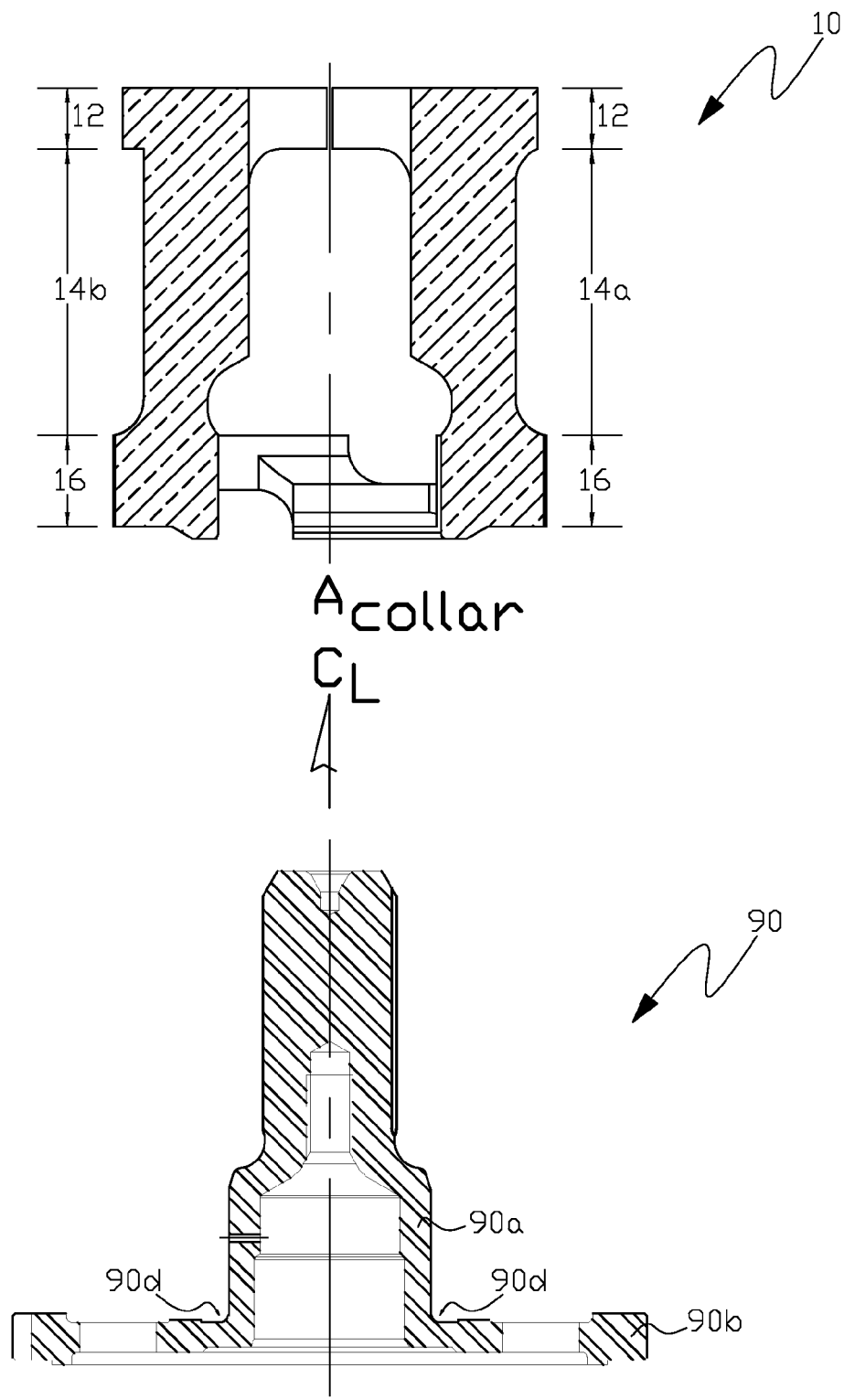
FIG. 6 illustrates in cross sectional elevation a complex workpiece prior to loading into the single-shot inductor shown in FIG. 3.
Figure 7:
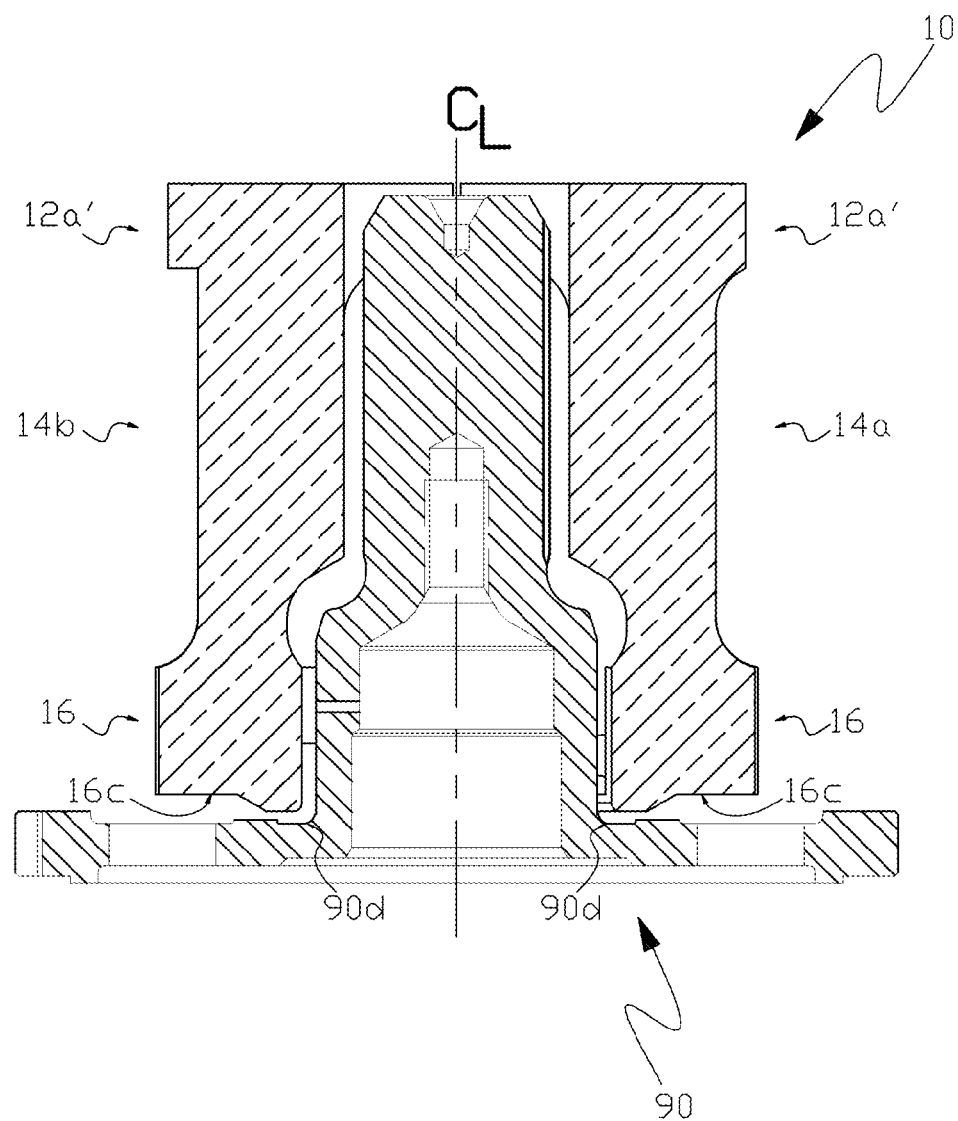
FIG. 7 illustrates in cross sectional elevation through a planar cut of the longitudinal leg sections a complex workpiece after loading into the single-shot inductor shown in FIG. 3.

FIG. 6 illustrates complex workpiece 90 prior to loading into single-shot inductor 10. FIG. 7 illustrates complex workpiece 90 loaded into single-shot inductor 10 for an induction heat treatment process. Suitable apparatus can be provided for loaded complex workpiece 90 for rotation about central axis $C_L$ at least during a portion of the heat treatment process. Since collar section 16 surrounds the entire circumference of loaded complex workpiece 90, heating energy in fillet region 90d is increased without the necessity of excessive reduction of the current carrying face of the inductor and without the necessity of excessive increase of the magnitude of coil current.

If a complex workpiece is located asymmetrically within inductor 10 (that is, the axis of symmetry ($A_{collar}$) of collar inductor section 16 does not coincide with the axis of symmetry ($C_L$) of complex workpiece 90 within inductor 10), there will be a reduced induced heating effect produced in one of the two half-collar sections that has an increased inductor-to-workpiece gap, which is offset by an increased induced heating effect produced in the other one of the two half-collar sections that has a reduced inductor-to-workpiece gap. Consequently the induction heat treatment process sensitivity associated with the positioning of complex workpiece 90 within inductor 10 is reduced over that described above for a prior art single turn channel inductor.

Figure 8:
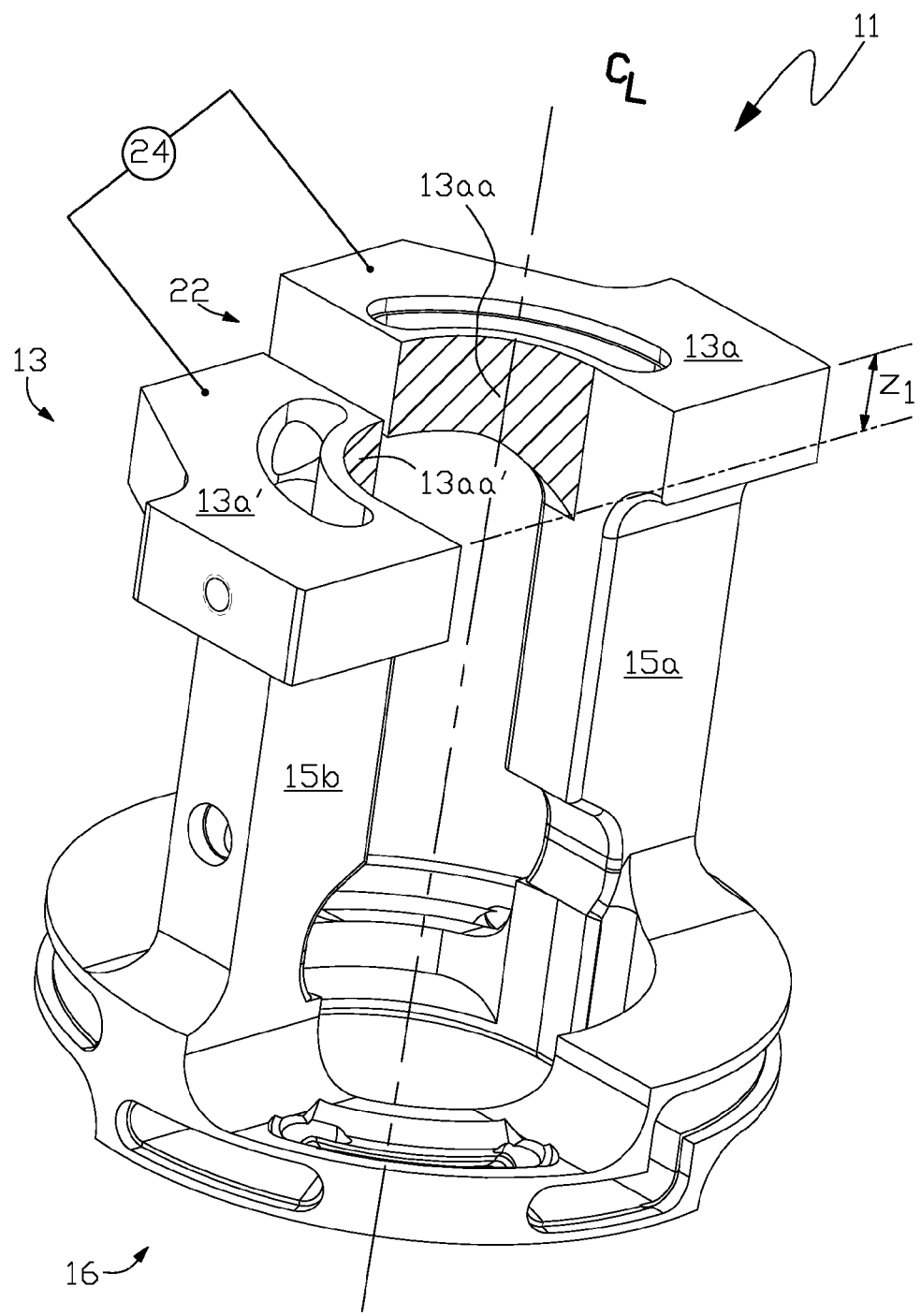
FIG. 8 diagrammatically illustrates another example of a single-shot inductor of the present invention.

FIG. 8 illustrates another example of a single-shot inductor 11 of the present invention. In this example, unlike single-shot inductor 10, the longitudinal lengths of longitudinal leg inductor sections 15a and 15b are unequal so that crossover half-sections 13a and 13a' of crossover inductor section 13 will be located at different distances around the central axis of a workpiece loaded in single-shot inductor 11. When the longitudinal lengths of the longitudinal leg sections are of different lengths, the supply and return crossover sections will be non-coplanar to each other relative to corresponding cross sectional radial planes of the supply and return crossover sections perpendicular to central axis $C_L$ as illustrated in FIG. 8 by planar separation $z_1$ between crossover half-sections 13a and 13a'. Additionally profiling of faces 13aa and 13aa' (shown crosshatched) of crossover half sections 13a and 13a' can be different. In FIG. 8 collar inductor section 16 may be similar to collar inductor section 16 for single shot inductor 10.

Figure 9A:
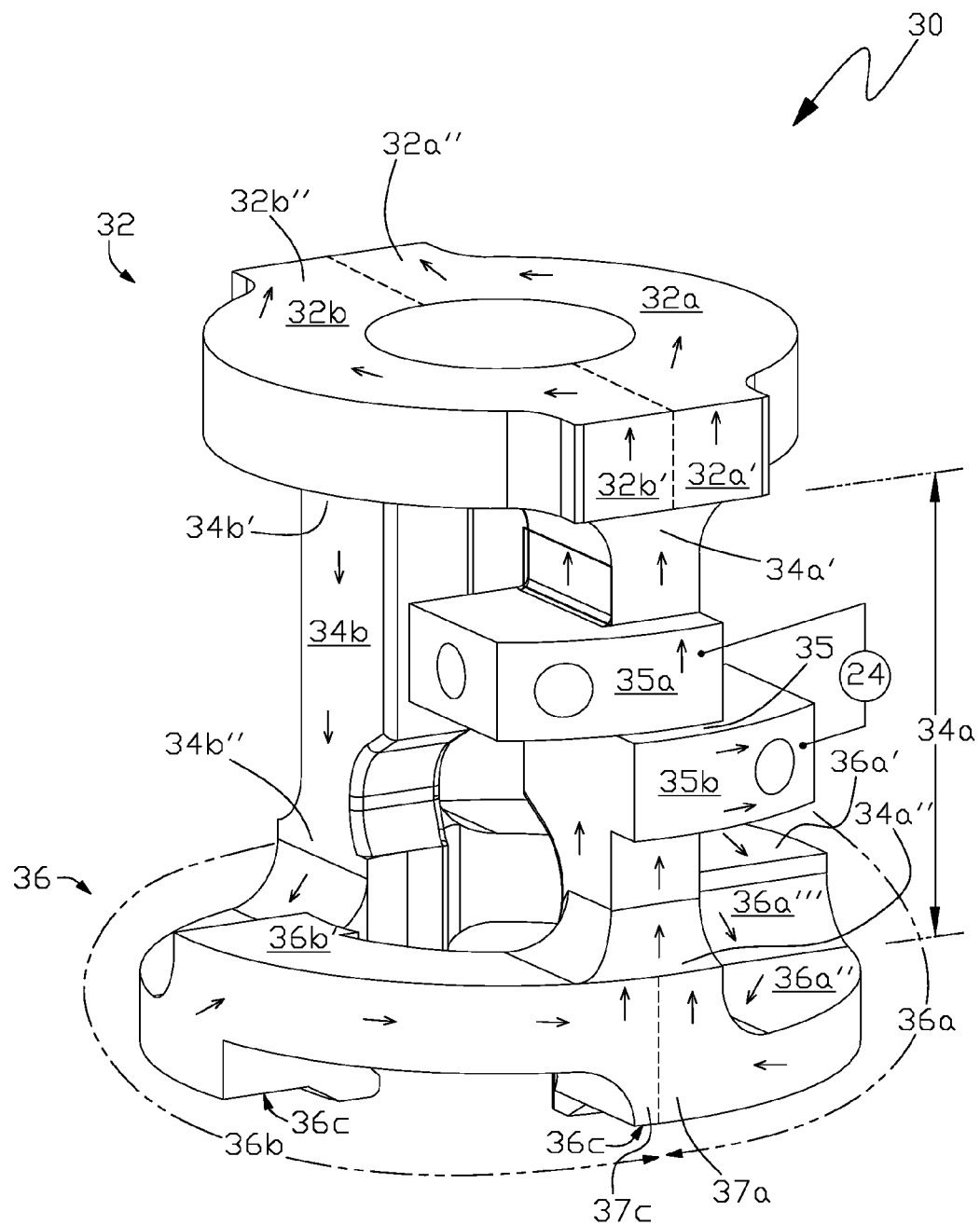
FIG. 9(a) and FIG. 9(b) are isometric views of another example of a single-shot inductor of the present invention with arrows indicating instantaneous current flow through the inductor.
Figure 9B:
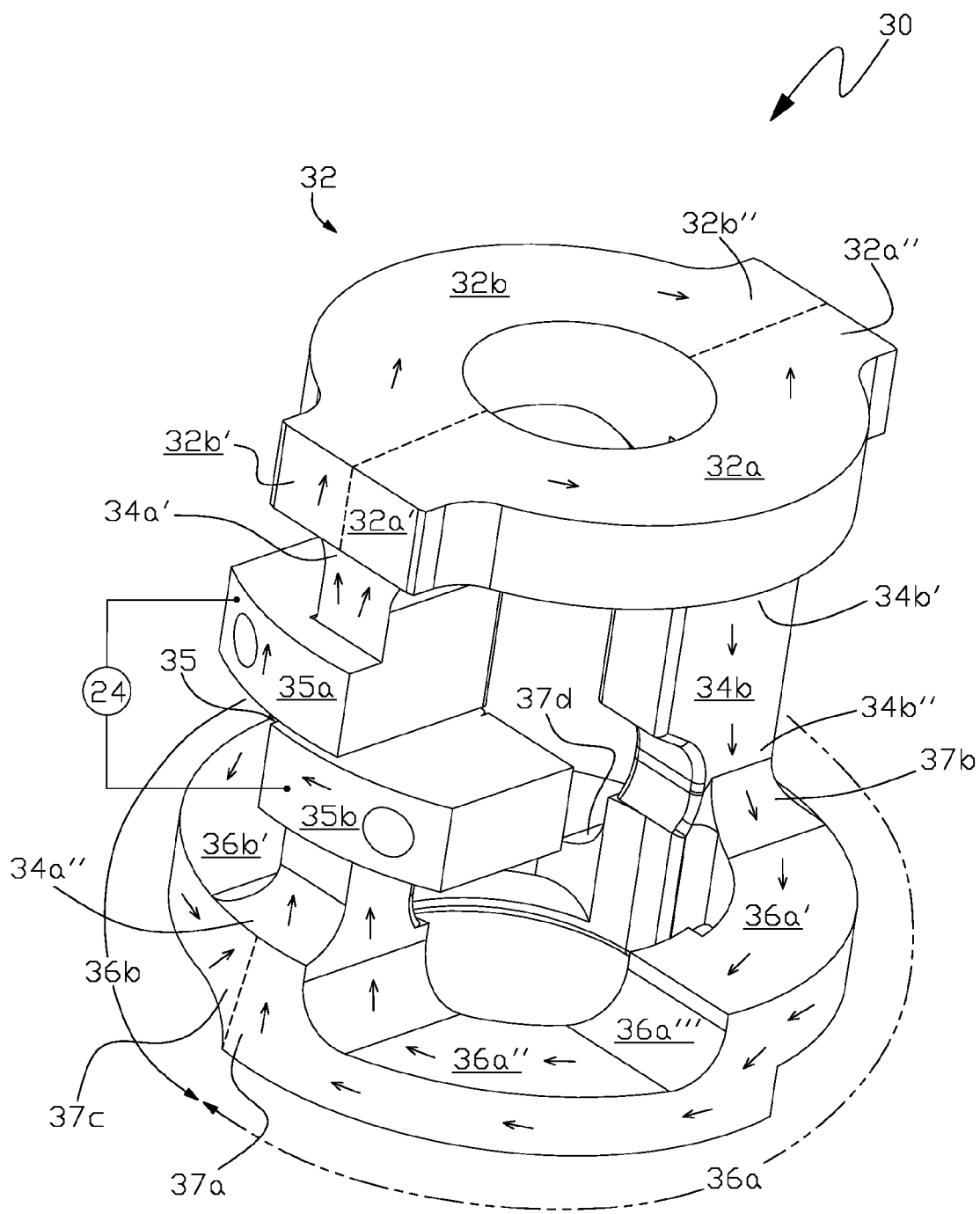

FIG. 9(a) and FIG. 9(b) illustrate another example of a single-shot inductor 30 of the present invention. In this embodiment a second collar inductor section replaces the crossover inductor section in other embodiments of the invention, and one of the two longitudinal leg sections is split into two electrically isolated longitudinal half-leg sections so that power source 24 can be connected between the longitudinal half-leg sections and the two collar inductor sections at the opposing ends of the longitudinal leg sections of single-shot inductor 30 are connected together in series by non-split longitudinal leg section 34b. For convenience in FIG. 9(a) and FIG. 9(b) the two collar inductor sections are referred to as top collar inductor section 32 and bottom collar inductor section 36 without limitation to the top and bottom spatial orientation of the two collar inductor sections. Top collar inductor section 32 comprises top collar first section 32*a* and top collar second section 32*b* which are connected electrically in parallel. Dashed lines are used for reference to the ends of each collar section; top collar 32 is typically fabricated as a continuous generally annular cylindrical component. Top collar first section has opposing top collar first section first leg end 32*a*' and top collar first section second leg end 32*a*", and the top collar second section has opposing top collar second section first leg end 32*b*' and top collar second section second leg end 32*b*". Bottom collar inductor section 36 comprises bottom collar first section 36*a* and bottom collar second section 36*b*. Bottom collar first section 36*a* has opposing bottom collar first section first leg end 37*a* and bottom collar first section second leg end 37*b*, and the bottom collar second section 36*b* has opposing bottom collar second section first leg end 37*c* and bottom collar second section second leg end 37*d*. Power supply longitudinal leg inductor section 34*a* has a power supply longitudinal leg top collar section end 34*a*' and a power supply longitudinal leg bottom collar section end 34*a*". Power source supply terminal 35*a* and power source return terminal 35*b* are disposed between the power supply longitudinal leg top collar section end and the power supply longitudinal leg bottom collar section end. The terms "supply" and "return" are used for convenience and not limitation of orientation of single-shot inductor 30, and the arrows show an instantaneous direction of alternating current flow through single-shot inductor 30. Electrical isolation between the power source supply and return terminals is provided by space 35 between the terminals that may be dielectric air-filled or with a dielectric material such as sheet mica. Power supply longitudinal leg top collar section end 34*a*' is connected to top collar first and second sections first leg ends 32*a*' and 32*b*', and the power supply longitudinal leg bottom collar section end 34*a*" is connected to bottom collar first and second sections first leg ends 37*a* and 37*c*. Return longitudinal leg inductor section 34*b* has return longitudinal leg top collar section end 34*b*' and return longitudinal leg bottom collar section end 34*b*". Return longitudinal leg top collar section end 34*b*' is connected to the top collar first and second sections second leg ends 32*a*" and 32*b*", and return longitudinal leg bottom collar section end 34*b*" is connected to bottom collar first and second sections second leg ends 37*b* and 37*d* so that when the complex workpiece is loaded in single-shot inductor 30, the at least partially cylindrical component of the complex workpiece being heat treated is situated between the power supply longitudinal leg inductor section 34*a* and the power supply return longitudinal leg inductor section 34*b*, and the circular component of the complex workpiece is situated adjacent to the exterior face 36*c* of bottom collar 36, and an alternating current power source is connected between the power source supply terminal 35*a* and power source return terminal 35*b*, the complex workpiece is inductively heat treated. The exterior face 36*c* of the bottom collar inductor section is the face of the bottom coil facing away from the top collar inductor section. In this example, profiled regions 36*a*', 36*a*", and 36*a*'" in bottom collar first section 36*a*, and profiled regions 36*b*', 36*b*", and 36*b*'" in bottom collar second section 36*b* are respectively similar to profiled regions 16*a*', 16*a*", and 16*a*'" in bottom collar first section 16*a*, and profiled regions 16*b*', 16*b*", and 16*b*'" in bottom collar second section 16*b* of single-shot inductor 10.

In FIG. 9(*a*) and FIG. 9(*b*) the top and bottom collar inductor sections are each generally (that is, without profiling) in the shape of an annular cylindrical ring with the collar half-sections being annular semicylindrical rings of equal arcuate length and the opposing longitudinal leg sections connected to the adjacent ends of the two collar half-sections; in other examples of the invention the collar half-sections may be of unequal arcuate length for a particular workpiece being heat treated. In FIG. 9(*a*) and FIG. 9(*b*) the split and non-split longitudinal leg inductor sections are each generally (that is, without profiling) a rectangular bar in shape and generally (that is, without profiling) perpendicular to top and bottom collar inductor section cross sectional radial planes that are perpendicular to central axis $C_L$, and maybe otherwise shaped or oriented in other embodiments of the invention for a particular complex workpiece being heat treated.

One preferable dual separate cooling circuit arrangement for single shot inductor 30 in FIG. 9(*a*) and FIG. 9(*b*) is a dual isolated cooling circuit arrangement where, for example, the first isolated cooling circuit flows through top collar 32 and the second isolated cooling circuit flows through bottom collar 36. In other embodiments of the invention a single or multiple isolated cooling circuits can be utilized for single-shot inductor 30 in FIG. 9(*a*) and FIG. 9(*b*).

In other examples of the present invention the single-shot inductor 10 or 11 of the present invention may be a single-shot multi-turn inductor, for example, a single-shot two-turn inductor with two collar inductor sections and a separate pair of longitudinal leg sections connected to each collar inductor section.

The complex workpiece feature of the at least partially cylindrical component having its central axis coincident with the central axis of the circular component includes complex workpieces where the central axis of the at least partially cylindrical component is non-coincident and can still be inserted (loaded) between the longitudinal leg inductor sections of the single-shot inductor of the present invention while maintaining a minimum radial air gap between the at least partially cylindrical component and the longitudinal leg inductor sections.

The single-shot inductor of the present invention can also be optionally used to induction heat treat cylindrical workpieces such as shafts.

While the above examples of the single-shot inductor are with the inductor and workpiece axially oriented in the vertical direction, any other orientation may be used in other examples of the invention. The terms "top" and "bottom," and "supply" and "return" are used merely for illustration and do limit the scope of the invention since other orientations of the single-shot inductor are acceptable.

Quenching of a workpiece heated in a single-shot inductor of the present invention can be accomplished either after the workpiece is heated and removed from the single-shot inductor or in other examples of the invention quench passages can be provided internal to a single-shot inductor of the present invention and quenchant from a suitable source can be supplied through the internal quench passages to quench the workpiece while it is still unloaded from the single-shot inductor.

Any of the single-shot inductors of the present invention can be fabricated as a monolithic inductor, for example, from a copper block by computer-aided manufacturing (CAM).

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A single-shot inductor for an induction heat treatment of a complex workpiece comprising an at least partially cylindrical component with its central axis coincident with the central axis of a circular component, the at least partially cylindrical component connected at one end to the circular component and the circular component having a circular component diameter larger than a cylindrical component diameter of the at least partially cylindrical component, the single-shot inductor comprising:
    a crossover inductor section, the crossover inductor section comprising a supply crossover section and a return crossover section, the supply crossover section having a power source supply end and a supply leg crossover section end, the supply leg crossover section end opposing the power source supply end, the return crossover section having a power source return end and a return leg crossover section end, the return leg crossover section end opposing the power source return end, the supply crossover section and the return crossover section electrically isolated from each other between the power source supply end and the power source return end, the power source supply end and the power source return end located adjacent to each other and separated by a dielectric;
    a collar inductor section, the collar inductor section comprising a first collar section and a second collar section, the first collar section having a first collar section supply leg end and a first collar section return leg end, the first collar section return leg end opposing the first collar section supply leg end, the second collar section having a second collar section supply leg end and a second collar section return leg end, the second collar section return leg end opposing the second collar section supply leg end;
    a supply longitudinal leg inductor section having a supply leg crossover end and a supply leg collar end, the supply leg collar end opposing the supply leg crossover end, the supply leg crossover end connected to the supply leg crossover section end, and the supply leg collar end connected between the first collar section supply leg end and the second collar section supply leg end; and
    a return longitudinal leg inductor section having a return leg crossover end and a return leg collar end, the return leg collar end opposing the return leg crossover end, the return leg crossover end connected to the return leg crossover section end, and the return leg collar end connected between the first collar section return leg end and the second collar section return leg end to form a continuous electrical conductor from the first collar section and the second collar section around the supply leg collar end of the supply longitudinal leg inductor section and the return leg collar end of the return longitudinal leg inductor section whereby when the at least partially cylindrical component of the complex workpiece is situated between the supply longitudinal leg inductor section and the return longitudinal leg inductor section and the circular component is situated adjacent to the exterior face of the collar inductor section, and an alternating current power source is connected between the power source supply end of the supply crossover section and the power source return end of the return crossover section, the complex workpiece is inductively heat treated.

2. The single-shot inductor of claim 1 wherein:
    the crossover inductor section is generally semicylindrical in shape, and the supply crossover section and the return crossover section are each generally quarter-cylindrical in shape;
    the collar inductor section is generally an annular cylindrical ring in shape, and the first collar section and the second collar section are each generally annular semi-cylindrical rings in shape and of equal arcuate length; and
    the supply longitudinal leg inductor section and the return longitudinal leg inductor section are generally perpendicularly oriented in length to a radial plane of the crossover inductor section and the collar inductor section.

3. The single-shot inductor of claim 1 wherein the supply crossover section and the return crossover section are non-coplanar to each other.

4. The single-shot inductor of claim 1 further comprising at least one profiled region in at least one of the supply crossover section, the return crossover section, the supply longitudinal leg inductor section, the return longitudinal leg inductor section, the first collar section or the second collar section.

5. The single-shot inductor of claim 4 wherein the at least one profiled region comprises a stepped profile region.

6. The single-shot inductor of claim 1 further comprising at least one internal cooling circuit formed within the crossover inductor section, the supply longitudinal leg inductor section, the return longitudinal leg inductor section and the collar inductor section for flowing a cooling medium within the at least one internal cooling circuit.

7. The single-shot inductor of claim 1 further comprising;
    a first cooling circuit comprising:
        a first cooling circuit supply inlet port in communication with a first collar section internal cooling passage in the first collar section;
        a return longitudinal leg inductor section internal cooling passage in the return longitudinal leg inductor section in communication with the first collar section internal cooling passage;
        an return crossover section internal cooling passage in the return crossover section in communication with the return longitudinal leg inductor section internal cooling passage; and
        a first cooling circuit return outlet port in communication with the return crossover section internal cooling passage whereby a cooling medium flows sequentially through the first collar section, the return longitudinal leg inductor section and the return crossover section; and a second cooling circuit comprising:
  a second cooling circuit supply inlet port in communication with a second collar section internal cooling passage in the second collar section;
  a supply longitudinal leg inductor section internal cooling passage in the supply longitudinal leg inductor section in communication with the second collar section internal cooling passage;
  a supply crossover section internal cooling passage in the supply crossover section in communication with the supply longitudinal leg inductor section internal cooling passage; and
  a second cooling circuit return outlet port in communication with the supply crossover section internal cooling passage whereby the cooling medium flows sequentially through the second collar section, the supply longitudinal leg inductor section and the supply crossover section.

8. A single-shot inductor for an inductor heat treatment of a complex workpiece comprising an at least partially cylindrical component with its central axis coincident with the central axis of a circular component, the at least partially cylindrical component connected at one end to the circular component and the circular component having a circular component diameter larger than a cylindrical component diameter of the at least partially cylindrical component, the single-shot inductor comprising:
  a top collar inductor section, the top collar inductor section comprising a top collar first section and a top collar second section, the top collar first section having a top collar first section first leg end and a top collar first section second leg end, the top collar first section second leg end opposing the top collar first section first leg end, the top collar second section having a top collar second section first leg end and a top collar second section second leg end, the top collar second section second leg end opposing the top collar second section first leg end;
  a bottom collar inductor section, the bottom collar inductor section comprising a bottom collar first section and a bottom collar second section, the bottom collar first section having a bottom collar first section first leg end and a bottom collar first section second leg end, the bottom collar first section second leg end opposing the bottom collar first section first leg end, the bottom collar second section having a bottom collar second section first leg end and a bottom collar second section second leg end, the bottom collar second section second leg end opposing the bottom collar second section first leg end;
  a power supply longitudinal leg inductor section having a power supply longitudinal leg top collar section end and a power supply longitudinal leg bottom collar section end, a power source supply terminal and a power source return terminal disposed between the power supply longitudinal leg top collar section end and the power supply longitudinal leg bottom collar section end, the power source supply terminal and the power source return terminal electrically isolated from each other, the power supply longitudinal leg top collar section end connected to the top collar first section first leg end and the top collar second section first leg end, and the power supply longitudinal leg bottom collar section end connected to the bottom collar first section first leg end and the bottom collar second section first leg end; and
  a return longitudinal leg inductor section having a return longitudinal leg top collar section end and a return longitudinal leg bottom collar section end, the return longitudinal leg bottom collar section end opposing the return longitudinal leg top collar section end, the return longitudinal leg top collar section end connected to the top collar first section second leg end and the top collar second section second leg end, and the return longitudinal leg bottom collar section end connected to the bottom collar first section second leg end and the bottom collar second section second leg end, whereby when the complex workpiece is loaded in the single-shot inductor, the at least partially cylindrical component is situated between the power supply longitudinal leg inductor section and the return longitudinal leg inductor section and the circular component is situated adjacent to the exterior face of the bottom collar inductor section, and an alternating current power source is connected between the power source supply terminal and the power source return terminal, the complex workpiece is inductively heat treated.

9. The single-shot inductor of claim 8 wherein:
  the top collar inductor section and the bottom collar inductor section are each generally an annular cylindrical ring in shape; the top collar first section and the top collar second section are each generally annular semicylindrical rings in shape and of equal arcuate length; and the bottom collar first section and the bottom collar second section are each generally annular semicylindrical rings in shape and of equal arcuate length; and
  the power supply longitudinal leg inductor section and the return longitudinal leg inductor section are generally perpendicularly oriented in length to a radial plane of the top collar inductor section and the bottom collar inductor section.

10. The single-shot inductor of claim 8 wherein the distance between the power source supply terminal and the power supply longitudinal leg top collar section end is not equal to the distance between the power source return terminal and the power supply longitudinal leg bottom collar section end.

11. The single-shot inductor of claim 8 further comprising at least one profiled region in at least one of the top collar inductor section, the bottom collar inductor section, the power supply longitudinal leg inductor section or the return longitudinal leg inductor section.

12. The single-shot inductor of claim 11 wherein the at least one profiled region comprises a stepped profile region.

13. The single-shot inductor of claim 8 further comprising at least one or more internal cooling circuits formed within the top collar inductor section, the power supply longitudinal leg inductor section, the return longitudinal leg inductor section, and the bottom collar inductor section for flowing a cooling medium within the at least one or more internal cooling circuits.

14. A method of single-shot induction heat treatment of a complex workpiece comprising an at least partially cylindrical component with its central axis coincident with the central axis of a circular component, the at least partially cylindrical component connected at one end to the circular component and the circular component having a circular component diameter larger than a cylindrical component diameter of the at least partially cylindrical component, with a heat treatment inductor comprising: a crossover inductor section, the crossover inductor section comprising a supply crossover section and a return crossover section, the supply crossover section having a power source supply end and a supply leg crossover section end, the supply leg crossover section end opposing the power source supply end, the return crossover section having a power source return end and a return leg crossover section end, the return leg crossover section end opposing the power source return end, the supply crossover section and the return crossover section electrically isolated from each other between the power source supply end and the power source return end, the power source supply end and the power source return end located adjacent to each other and separated by a dielectric; a collar inductor section, the collar inductor section comprising a first collar section and a second collar section, the first collar section having a first collar section supply leg end and a first collar section return leg end, the first collar section return leg end opposing the first collar section supply leg end, the second collar section having a second collar section supply leg end and a second collar section return leg end, the second collar section return leg end opposing the second collar section supply leg end; a supply longitudinal leg inductor section having a supply leg crossover end and a supply leg collar end, the supply leg collar end opposing the supply leg crossover end, the supply leg crossover end connected to the supply leg crossover section end, and the supply leg collar end connected between the first collar section supply leg end and the second collar section supply leg end; and a return longitudinal leg inductor section having a return leg crossover end and a return leg collar end, the return leg collar end opposing the return leg crossover end, the return leg crossover end connected to the return leg crossover section end, and the return leg collar end connected between the first collar section return leg end and the second collar section return leg end to form a continuous electrical conductor from the first collar section and the second collar section around the supply leg collar end of the supply longitudinal leg inductor section and the return leg collar end of the return longitudinal leg inductor section, the method comprising:

loading the at least partially cylindrical component of the complex workpiece between the supply longitudinal leg inductor section and the return longitudinal leg inductor section so that the circular component is situated adjacent to the exterior face of the collar inductor section of the heat treatment inductor;

supplying an alternating current between the power source supply end of the supply crossover section and the power source return end of the return crossover section to inductively heat treat the complex workpiece; and unloading the complex workpiece from the heat treatment inductor.

15. The method of claim 14 further comprising rotating the complex workpiece about the central axis of the complex workpiece while at least part of a time period when supplying the alternating current between the power source supply end of the supply crossover section and the power source return end of the return crossover section.

\* \* \* \* \*